3,072,593
MANUFACTURE OF MOLDED ARTICLES FROM MIXTURES OF OIL SHALE AND A SOLID OLEFIN POLYMER
John W. Marx and Harry W. Parker, Bartlesville, Okla., assignors to Phillips Petroleum Company, a corporation of Delaware
No Drawing. Filed Dec. 28, 1959, Ser. No. 862,034
21 Claims. (Cl. 260—33.6)

This invention relates to the manufacture of molded articles and to other preformed articles useful as construction materials. In one aspect the invention relates to a method for molding a mixture of oil shale and a solid polyolefin to produce an article of controlled density, tensile strength, and other physical properties within predetermined ranges. In still another aspect the invention relates to a molded article wherein a solid polyolefin and the kerogen of an oil shale cooperate to provide the binder for the molded article.

In the prior art molded articles have been prepared from various naturally-occurring materials after suitable preparation. A binder is included to bind the material during molding. The molding is done either by pressure alone or by heat and pressure in combination before, or after, suitable treatment of the naturally-occurring material. Such naturally-occurring materials which have been used heretofore in the molding art include clay, pitch, Gilsonite, rock asphalt, peat, diatomaceous earth, and the like. Many synthetic materials have been developed to provide more desirable properties or more reproducible properties in the molded articles.

It has recently been proposed to produce molded articles by the combined action of heat and pressure on oil shales containing at least about 45 gallons of oil per ton of mineral. Although such articles have utility, the process is not economically attractive because the process is limited to oil shales which are unusually rich in oil content and excludes the vast deposits of oil shales which contain less than 45 gallons of available oil per ton of shale and are, for that reason, more competitive in price for use in the formation of shaped articles than are the richer oil shale deposits. As might be expected, oil shale deposits which assay less than 45 gallons of available oil per ton of oil shale are more abundant than are the richer oil shales.

It is an object of this invention to provide compositions, for molding and for formation into shaped articles, from oil shales containing from 15 to 85 gallons of recoverable oil per ton of oil shale. It is also an object of this invention to provide shaped articles of oil shale wherein a solid polyolefin and the kerogen of the oil shale cooperate to provide a binder for the inorganic constituents of the shale. It is also an object of this invention to provide shaped articles whose characteristics of density and brittleness are controlled within predetermined ranges. Still another object of this invention is the provision of a method for rendering porous, articles shaped from oil shale wherein a solid polyolefin and the kerogen of the oil shale provide the binder materials for the inorganic constituents of the shale. Other objects and advantages will be apparent to one skilled in the art upon study of this disclosure, including the detailed description of the invention.

We have found that mixtures of finely divided solid polyolefins and finely divided oil shale can be molded into articles having properties not possessed by articles molded from either of the molding powders alone. These properties are further characterized in that the differences can not be explained as a simple linear addition of the properties of the materials making up the mixtures. We have found that oil shales containing as little as 15 gallons of recoverable oil per ton of oil shale can be utilized in making the molding powders of the invention. Articles produced from the molding powders of this invention display lasting beauty, good mechanical strength, and high electrical resistivity as well as controlled characteristics of density and brittleness.

Oil shales having a recoverable oil content of from 15 to 85 or more gallons per ton of oil shale are crushed or ground to an average particle size of from about ¼ inch to that which will pass through a 200-mesh screen. The ground oil shale is then intimately admixed with a finely divided solid polyolefin having an average particle size comparable to that of the oil shale and the mixture is then subjected to heat and pressure to produce the desired shaped article. The powdered or granulated blend is placed in a closed mold and heated to a temperature in the range of about 250 to about 400° F. while applying a pressure of about 500 to about 20,000 p.s.i., or higher, for about ½ to 10 minutes. The mold is then cooled to a temperature generally below 250° F. before the pressure is released. The molding temperature is, in every case, below the decomposition temperature of the kerogen and the polyolefin. The molding time will be that necessary to plasticize the kerogen and polyolefin and will depend upon the molding temperature and the size of the article being molded.

Oil shales containing kerogen equivalent to about 25 to about 35 gallons of oil per ton of shale are particularly desirable from the standpoint of excellence of molded article and availability of oil shale.

While entirely satisfactory results are obtained by dry-blending the two molding powders, it is preferable to utilize procedures similar to those employed in the rubber industry, for example, milling or Banbury mixing to reduce the materials to a substantially homogeneous mixture. Extruders or extrusion rolls can then be utilized to form articles of manufacture from the blended mixtures. Articles such as floor tile, siding, roofing and other building materials are examples of products which can be manufactured readily from these materials. The hot-sheeted material from the rolls or extruder can also be blown and/or sucked into irregular shapes such as domes, cones and the like. Slabs from the rolls and rods or tubes from the extruders can be utilized as such without being subjected to molding pressure. The maximum beneficial effect of the compatibility of the polyethylene and kerogen, however, is realized when the material is subjected to molding pressure.

Colored pigments and cover agents can be incorporated into the materials during the blending operations to form a wide spectrum of color ranging from light tan or buff through yellow, blue, green, and maroon.

The abrasion resistance and hardness of these materials are superior to the materials most commonly utilized in the fabrication of articles such as floor tile including resin-, rubber-, polyethylene- or asphalt-compositions. The mechanical strength of the molded articles of this invention is as good as, or superior to, similar conventionally molded articles. The appearance (shape, color, and porosity) of the molded articles is unaffected by contact with boiling water for as long as 16 hours.

The solid polyolefin can be combined with oil shale in all amounts; however, an amount of about 2 to about 95 weight percent of polyolefin based on the total composition will generally be used and about 5 to about 95 weight percent will usually be preferred where molded articles are to be produced. If it is desired to preserve the hardness contributed by the oil shale in the finished article, the polyolefin will be used in the range of about 5 to about 30 weight percent of the finished article; whereas, if a softer article is desired, about 30 to about 95 weight percent, or more, of the molding mixture will be polyolefin. Mixtures containing as little as about 2 weight percent of polyolefin are useful as heavy construction materials such as paving for roads and streets and for preformed or continuous piling for buildings or other heavy structure supports such as wharfs and docks.

Although any of the known polyolefins can be utilized in the molding powders of this invention, those polyolefins produced according to the process disclosed in U.S. Patent 2,825,721 are preferred because of their high molecular weights and their high values of crystallinity. Another satisfactory process comprises contacting ethylene or mixtures of ethylene with other unsaturated hydrocarbons with a suspension of chromium oxide-containing catalyst in a liquid hydrocarbon diluent, the contacting occurring at a temperature such that substantially all of the polymer produced is insoluble in the diluent and is in solid particle form, the particles being substantially non-tacky and non-agglutinative in the liquid diluent. The solid polyolefins applicable for use in the invention include polyethylene, polypropylene, polybutylene, and copolymers of ethylene and propylene and copolymers of ethylene and butylene.

Any commercial polyethylene can be utilized, although some sacrifice in surface hardness will result from use of the softer grades of polyethylene. In order to grind some of the softer polyolefins, it will usually be desirable to reduce the temperature of the polyolefin such as by grinding with Dry Ice. Obviously, other refrigeration means can be utilized to embrittle the polyolefin.

In some applications it may be desirable to add the polyethylene in flakes or shreds in order to obtain mottled effects or to take advantage of the high tensile strength of the polyethylene in either one or random directions.

When the polyethylene and the oil shale are blended together in a roll mill or a mixer, such as a Banbury mixer, it is not necessary to reduce the size of the polyethylene beyond that which results from ordinary methods of manufacture.

It is a feature of this invention that articles formed by the process hereinbefore described can be rendered porous by reheating the molded article at near atmospheric pressure to a temperature in the range of 400 to 550° F. This procedure produces a low-density, rigid, mechanically-strong, porous solid capable of being used in sheets, blocks, and slabs as a low cost construction material. Although the exact mechanism of the reaction has not been determined, it is believed that reheating the molded articles at atmospheric pressure tends to decompose a portion of the kerogen and to carbonize a portion of the kerogen so that the resulting evolution of gases expands the material and renders it porous.

The following specific examples present data which illustrate and clarify the invention, but should not be so interpreted as to restrict or limit the invention unnecessarily.

EXAMPLE I

Samples were dry-blended utilizing various proportions of 40 to 100 mesh polyethylene having a density of 0.960 and a melt index of 0.9, as determined by the methods described in column 38 of U.S. Patent 2,825,721, and 100 mesh Colorado oil shale containing 30 gallons per ton of recoverable shale oil. These materials were all molded in a 1¼-inch cylindrical mold at a pressure of 5,000 p.s.i. and at a temperature of 3160° F. The mold was heated to operating temperature, the pressure applied and the mold was then held in closed position for two minutes after which it was cooled below 2480° F. and opened.

Immediately after molding Shore "D" hardness was determined on the molded discs. The results for various compositions are compared to discs of 100 percent polyethylene and 100 percent oil shale in Table I. In this table the results under "calculated value" were obtained by adding the two plastic materials making up the blend.

Table I

| Composition Polyethylene/Oil Shale | Shore "D" Hardness | Shore "D" Hardness Calculated |
|---|---|---|
| 100/0 | 64–58 | |
| 75/25 | 68–63 | 69–64 |
| 50/50 | 67–64 | 74–70.5 |
| 40/60 | 68–66 | 76–73 |
| 30/70 | 76–68 | 78–76.5 |
| 20/80 | 79–74 | 80–78 |
| 10/90 | 79–77 | 82–80.5 |
| 5/95 | 82–80 | 83–81.7 |
| 2.5/97.5 | 82–82 | |
| 0/100 | 84–83 | |

The double set of figures for the Shore "D" hardness values in the examples represents two values of hardness. The higher value being the instantaneous reading and the lower value being the reading as the pressure on the needle is continued and attains a steady value. A difference indicates a slight tendency for the molded articles to flow under pressure and demonstrates a lack of brittleness in the article and the ability of the article to absorb shocks. This property produces a superior floor tile or wall board.

It will be noted that up to about 30 percent the hardness is little affected by the addition of polyethylene. At 30 percent and over the polyethylene has an unexpectedly high softening effect on the surface of the molded discs.

The appearance of these materials was light tan to black color and a smooth homonegeous texture. The non-brittle nature of the material containing 30 percent and more of polyethylene was demonstrated by driving 4-d nails through ¼-inch by 1¼-inch discs of the material without any tendency to crack the material.

Articles molded from mixtures of oil shale and polypropylene or copolymers of ethylene and propylene according to the procedure of Example I display lower values of Shore "D" hardness than those from mixtures of oil shale and polyethylene. Similarly, articles molded from mixtures of a polyolefin and oil shale containing less than 30 gallons of available oil per ton of shale have higher Shore "D" hardness values than those of Example I, whereas articles molded from mixtures of a polyolefin and oil shale containing more than 30 gallons of available oil per ton of shale have lower values of Shore "D" hardness than those of Example I.

EXAMPLE II

Another series of blends of polyethylene and oil shale were mixed on a roll mill. In these blends Colorado oil shale containing 30 gallons per ton of recoverable shale oil and particle form polyethylene as described in Example I, and having a particle size range of about 8 to 200 mesh, were mixed in various combinations from 10 weight percent polyethylene/90 weight percent oil shale to 50 weight percent polyethylene/50 weight percent oil shale. The blended materials were rolled into sheets of floor tile thickness and tiles 6 in. x 6 in. were molded in a press with 15 tons on the ram at 350° F. for 2 minutes. Tile made from the material containing 20 weight percent polyethylene and 80 weight percent oil shale had a color ranging from brown to black and exhibited properties which were as good as or superior to vinyl, rubber or asphalt tile in acid and solvent resistance, abrasion resistance and mechanical strength.

EXAMPLE III

Several batches of the floor tile mixture described in Example II were mixed in a Banbury mixer and pigments were added to the mix to make light tan, yellow, blue, and maroon displays. The covering pigment was titanium dioxide, and for the colors other than light tan a commercial pigment was blended into the titanium dioxide before addition to the plastic mix. Ten weight percent titanium dioxide with 2.5 weight percent of color pigment was found adequate to make a series of pleasing colors.

EXAMPLE IV

Several batches of floor tile mixtures described in Example II were mixed on a roll mill at a temperature of about 350° F. and were rolled into sheets of floor tile thickness. Slabs containing 20 weight percent polyethylene and 80 weight percent oil shale were as good as or superior to vinyl, rubber or asphalt tile in acid and solvent resistance and in abrasion resistance.

EXAMPLE V

Tiles made as described in Example I and containing approximately 30 weight percent polyethylene and 70 weight percent oil shale were heated for one hour at 500° F. at atmospheric pressure. Results of tests on the tiles were as follows:

|  | Before Heating | After Heating |
| --- | --- | --- |
| Density | 1.57 | 1.38 |
| Hardness (Shore "D") | 68-65 | 71-70 |
| Linear Expansion, percent |  | 4 |

A 0.9 mm. diameter pin was driven through a sample of the treated material 11 mm. x 15 mm. x 4 mm. without cracking the material.

The same molded articles, after being heated in the atmosphere as in Example II, do not display this cold flow property and at the same time are not brittle. This property produces a superior building block or other load-bearing article.

Reasonable variations and modifications are possible within the scope of this disclosure without departing from the spirit and scope of the invention.

That which is claimed is:

1. The process of making molded articles which consists essentially of intimately admixing oil shale, containing at least about 15 gallons of recoverable oil per ton of oil shale, and a solid polymer of a mono 1-olefin and subjecting said mixture to molding pressure at a molding temperature in the range of about 250 to about 400° F.

2. The process of claim 1 wherein the polymer is polyethylene.

3. The process of claim 1 wherein the polymer is polypropylene.

4. The process of claim 1 wherein the polymer is polybutylene.

5. The process of claim 1 wherein the polymer is a copolymer of ethylene and propylene.

6. The process of claim 1 wherein the polymer is a copolymer of ethylene and butylene.

7. The process of claim 1 wherein the oil shale and polymer are finely divided and are dry blended prior to molding.

8. The process of claim 1 wherein the oil shale and polymer are milled together prior to molding.

9. The process of claim 1 wherein a pigment is incorporated in the mixture prior to molding.

10. The process of making molded articles which consists essentially of intimately admixing a finely divided solid polymer of a mono 1-olefin and finely divided oil shale, containing from about 15 to about 85 gallons of available oil per ton of oil shale, wherein the plyolefin is present in the range of about 2 to about 95 weight percent of the mixture; and subjecting the mixture to a temperature in the range of about 300 to about 350° F. and a pressure in the range of about 500 to about 20,000.

11. The process of making molded articles which consists essentially of intimately admixing finely divided solid polyethylene and finely divided oil shale containing about 25 to about 35 gallons of available oil per ton of shale, wherein the polyetheylene is present in the range of about 2 to about 95 weight percent of the mixture; and subjecting the mixture to a temperature in the range of about 300 to about 350° F. and a pressure in the range of about 500 to about 20,000 p.s.i.

12. A molding composition consisting essentially of a mixture of finely divided oil shale, containing at least about 15 gallons of recoverable oil per ton of oil shale, and finely divided, solid polymer of a mono 1-olefin.

13. A molding composition consisting essentially of a mixture of finely divided oil shale, containing at least about 15 gallons of recoverable oil per ton of oil shale, finely divided, solid polymer of a mono 1-olefin; and finely divided pigments.

14. A molding composition consisting essentially of a mixture of finely divided oil shale, containing at least about 15 gallons of recoverable oil per ton of oil shale, and finely divided, solid polyolefin wherein the polymer of a mono 1-olefin is present in the range of about 5 to about 95 weight percent of the mixture.

15. A molded article consisting essentially of a substantially homogeneous mixture of oil shale, containing at least about 15 gallons of recoverable oil per ton of oil shale, and a solid polymer of a mono 1-olefin, molded at a temperature in the range of about 250 to about 400° F. and at a pressure in the range of about 500 to about 20,000 p.s.i.

16. An article prepared by molding a mixture consisting essentially of oil shale, containing at least about 15 gallons of recoverable oil per ton of oil shale, and a solid polymer of a mono 1-olefin at a temperature in the range of about 300 to about 350° F. and a pressure in the range of about 500 to about 20,000 p.s.i.; and then by heating the molded article at a temperature in the range of about 400 to about 550° F. and about at substantially atmospheric pressure.

17. A molded article consisting essentially of a substantially homogeneous mixture of oil shale, containing at least about 15 gallons of recoverable oil per ton of oil shale, a solid polymer of a mono 1-olefin, and a pigment, molded at a temperature in the range of about 300 to about 350° F. and a pressure in the range of about 500 to about 20,000 p.s.i.

18. The process of making shaped articles which consists essentially of intimately admixing oil shale, containing at least about 15 gallons of recoverable oil per ton of oil shale, and a solid polymer of a mono 1-olefin at a temperature in the range of about 300 to about 350° F. and shaping the article.

19. The process of claim 18 wherein the polymer is present in an amount of about 2 to about 95 weight percent of the total composition.

20. An article prepared by intimately admixing a mixture consisting essentially of oil shale, containing at least about 15 gallons of recoverable oil per ton of oil shale, and a solid polymer of a mono 1-olefin at a temperature in the range of about 250 to about 400° F. and shaping the article.

21. The process of claim 1 wherein the molded article is heated to a temperature in the range of about 400 to about 550° F. and at substantially atmospheric pressure.

References Cited in the file of this patent

UNITED STATES PATENTS

| 1,649,545 | Renou | Nov. 15, 1927 |
| 2,475,699 | Derksen | July 12, 1949 |
| 2,825,721 | Hogan et al. | Mar. 4, 1958 |
| 2,900,269 | Bauman et al. | Aug. 18, 1959 |

FOREIGN PATENTS

| 105,831 | Great Britain | May 3, 1917 |